H. L. OPSAHL.
SPARK PLUG TESTER.
APPLICATION FILED SEPT. 7, 1920.
1,378,484. Patented May 17, 1921.
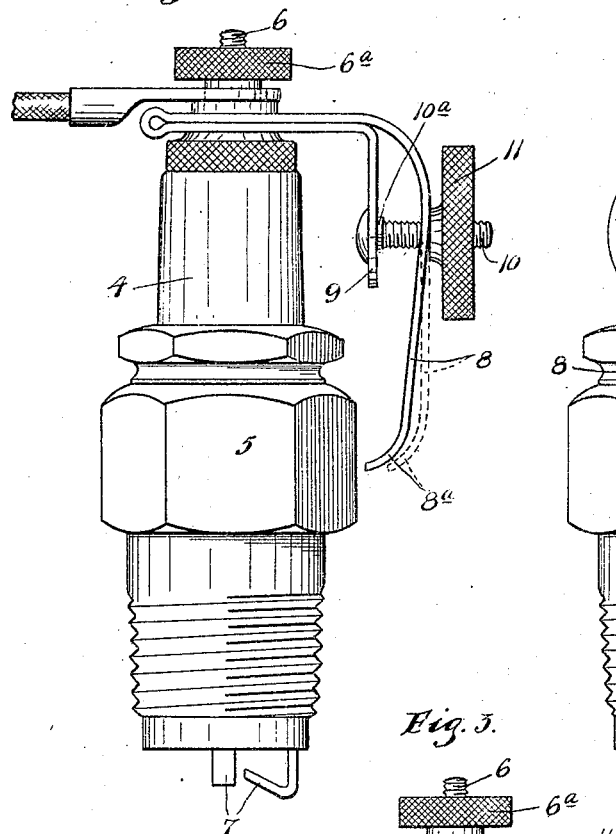
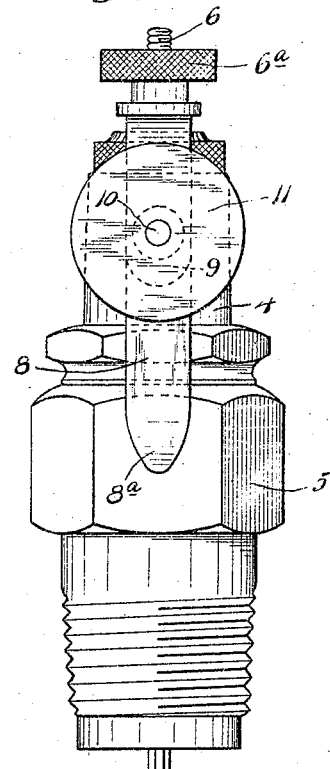
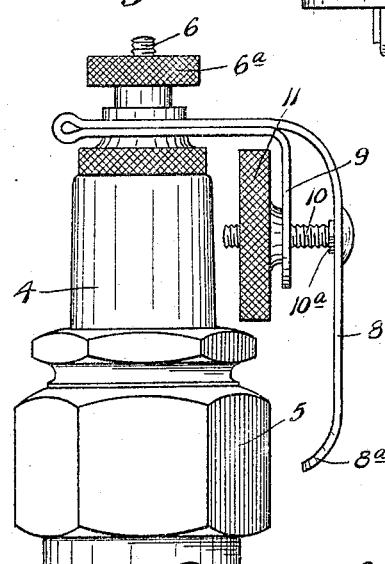
INVENTOR.
HARRY L. OPSAHL.
BY HIS ATTORNEYS.
Williamson & Merchant

UNITED STATES PATENT OFFICE.

HARRY L. OPSAHL, OF MINNEAPOLIS, MINNESOTA.

SPARK-PLUG TESTER.

1,378,484. Specification of Letters Patent. Patented May 17, 1921.

Application filed September 7, 1920. Serial No. 408,443.

*To all whom it may concern:*

Be it known that I, HARRY L. OPSAHL, a citizen of the United States, residing at Minneapolis, in the county of Hennepin and State of Minnesota, have invented certain new and useful Improvements in Spark-Plug Testers; and I do hereby declare the following to be a full, clear, and exact description of the invention, such as will enable others skilled in the art to which it appertains to make and use the same.

My invention has for its object to provide an extremely simple and highly efficient spark plug tester; and to this end consists of the novel devices and combinations of devices hereinafter described and defined in the claims.

My tester is permanently attached to the plug where it may always be seen alone or in combination with the other plugs of the engine. In this way, it is exceedingly easy to locate faulty plugs or a bad ignition circuit.

In addition to testing plugs for grounds or partial ground and testing the strength of the spark circuit, the length of the electrode gap may be ascertained by the adjustable means of my tester.

The invention is illustrated in the accompanying drawings, wherein like notations refer to like parts throughout the several views.

Referring to said drawings:—

Figure 1 is a side elevation of the spark plug with my tester operatively attached and its inoperative position shown in dotted lines;

Fig. 2 is a front elevation of the same; and

Fig. 3 is a side elevation of a portion of plug with a slight modification of my tester attached.

The numeral 4 indicates an ordinary spark plug having a metal shell 5, an electrode terminal 6 with a thumb screw $6^a$, and spark electrodes 7.

A strip of ribbon metal is bent together to form a spring testing finger 8 having a tip $8^a$, which coöperates with the metal shell 5 of the plug to form a pair of testing electrodes and an anchor arm 9 directly beneath said testing finger 8, the use of which we shall presently explain. The said folded metal strip, comprising the two above parts, is fastened to the terminal of the plug through coinciding holes in its folded end by means of the terminal thumb screw $6^a$. The spring tension, in the folded end of the said strip, serves to bind the thumb screw $6^a$ against the threads of the terminal 6, thus preventing said thumb screw $6^a$ from working loose. The spring finger 8 is longer than the anchor arm 9.

The anchor arm 9 has an adjusting screw 10 carried by and fastened rigidly to the same by means of a small lock nut $10^a$ on the inside of said arm. The screw 10 further passes through a hole in the testing finger 8 and is engaged by an insulated adjusting nut 11, which is operative to vary the distance of the finger tip $8^a$ from the shell 5 of the plug. The said anchor arm acts as a base of resistance to effect this adjustment. The modification of my device, shown in Fig. 3, consists simply in attaching the screw bolt 10 to the testing finger 8 and placing the adjusting nut 11 on the inside of the anchor arm 9.

*Operation.*

The testing finger 8 is adjusted from the inoperative dotted position, shown in Fig. 1, inwardly, until the gap between the testing electrode $8^a$ and the shell 5 begins to spark. The length of this testing gap will be equal to the electrode gap of the plug. This is due to the fact that electricity takes a path of least resistance and, when the two gaps are made the same, both will spark and not until then.

If the plug is grounded, there will be no spark from the testing finger despite all adjusting, and, if partially grounded, only a very weak spark will be observed. In case of a weak or faulty ignition system, the testers on all of the plugs will show uniformly weak sparks. By testing all of the plugs simultaneously, it will be found exceedingly simple to discover the faulty ones, ascertain the strength of the spark, and, by examining the respective testing gaps, find the length of the corresponding electrode gaps.

The insulated adjusting nut 11 allows a person to adjust the testing finger 8, without getting a shock.

My device is, of course, always attached to a plug where it may readily be adjusted and the sparks observed. When not being tested, the testing finger 8 is always adjusted outwardly to its inoperative position. This prevents any chance of dangers that might exist within an inclosed engine hood.

It is to be understood that this device is capable of variation in form, without departure from the spirit of the invention.

What I claim is:—

1. A spark plug tester comprising a single narrow strip of flexible material bent intermediate its ends to form a double thickness thereof and being attached to a spark plug through this double thickness, the ends thereof further bent to extend downwardly along the side of the spark plug in spaced relation, one end forming a testing electrode and the other end forming a base of resistance for adjusting said electrode toward and from the plug, and means for adjusting said electrode.

2. The structure set forth in claim 1, the electrode arm being longer than and extending below the arm forming the base of resistance for adjusting the electrode arm.

3. A spark plug tester attached to a spark plug having a testing finger attached to the terminal of the plug coöperating with the shell of said plug to form a pair of testing electrodes operative to test the plug and indicate the strength of the spark and the length of the electrode gap, an anchor arm also attached to the terminal acting as a base of resistance to adjust the testing finger from an inoperative to an operative position, and an insulated adjusted nut engaging an adjusting screw to affect the same.

4. A spark plug tester attached to the terminal of a spark plug comprising two parts, both of which are bent from a single strip of flexible metal, one a spring testing finger coöperating with the shell of the plug to form a pair of testing electrodes and the other an anchor arm acting as a base of resistance to adjust the testing finger from an idle to an operative position, and an insulated adjusting nut engaging an adjusting screw to affect the same, the said device being operative to test the plug and indicate the strength of the spark and the length of the electrode gap.

5. A spark plug tester attached to the terminal of a spark plug comprising two parts, both of which are bent from a single strip of flexible metal, the tension between the said two parts, near their fold, serving as a binder for the terminal thumb screw, one of said parts being a spring testing finger coöperating with the shell of the plug to form a pair of testing electrodes and the other an anchor arm acting as a base of resistance to adjust the testing finger from an idle to an operative position, and an insulated adjusting nut engaging an adjusting screw to affect the same, the said device being operative to test the plug and indicate the strength of the spark and the length of the electrode gap.

In testimony whereof I affix my signature.

HARRY L. OPSAHL.